United States Patent
Matsubara et al.

[19]
[11] Patent Number: 6,144,854
[45] Date of Patent: Nov. 7, 2000

[54] SATELLITE COMMUNICATION SYSTEM AND CENTER STATION

[75] Inventors: Noboru Matsubara; Katsumi Hirata; Kouichi Yamakawa, all of Kawasaki, Japan

[73] Assignee: Fujitsu Limited, Kawasaki, Japan

[21] Appl. No.: 09/167,431

[22] Filed: Oct. 6, 1998

[30] Foreign Application Priority Data

Mar. 2, 1998 [JP] Japan ................................. 10-049745

[51] Int. Cl.⁷ .............................. H04Q 7/20; H04B 7/00
[52] U.S. Cl. ........................................ 455/427; 455/527
[58] Field of Search ................................. 455/404, 403, 455/414, 427, 521, 527, 416, 517, 430, 15, 23; 379/48, 45, 41, 37

[56] References Cited

U.S. PATENT DOCUMENTS 4,037,158  7/1977  Eastmondf ........................... 455/527 X
5,636,269  6/1997  Eisdorfer ................................. 379/215
5,930,295  7/1999  Isley, Jr. et al. ..................... 455/426 X

FOREIGN PATENT DOCUMENTS 5-174969  10/1982  Japan .
59-134968  8/1984  Japan .

*Primary Examiner*—Tracy Legree
*Attorney, Agent, or Firm*—Helfgott & Karas, P.C.

[57] ABSTRACT

A satellite communication system capable of notifying an user in speaking that a connection request is transmitted and capable of being implemented at low cost. A satellite communication system in accordance with the SCPC method using a voice activation is structured with a center station. The center station, when receiving a connection request to an user in speaking, measures a level of a carrier assigned to a reception line for the user with a demodulator. In this center station, when the level is not more than a predetermined level, the modulator transmits a signal notifying the user that the connection request is received.

6 Claims, 8 Drawing Sheets

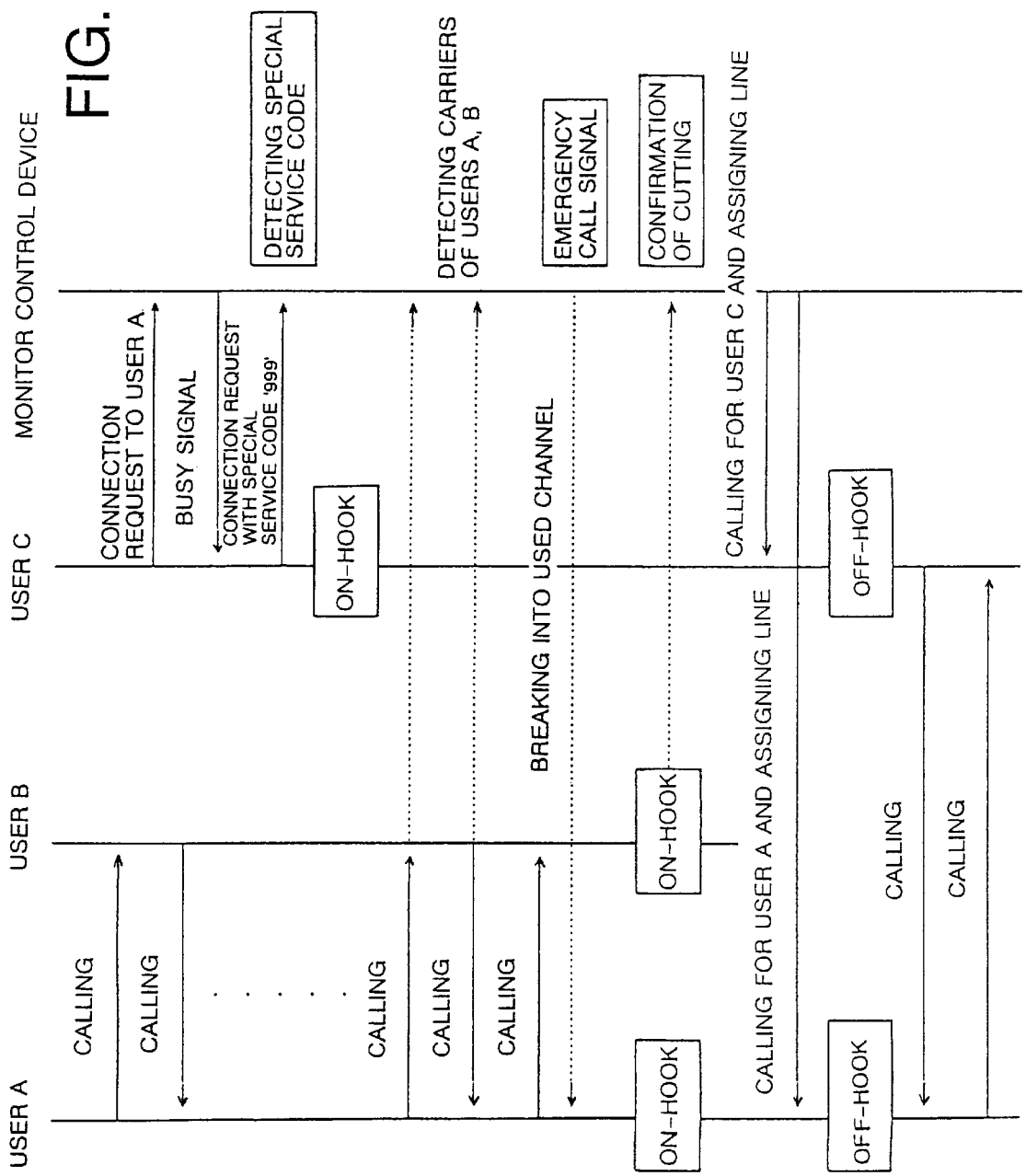

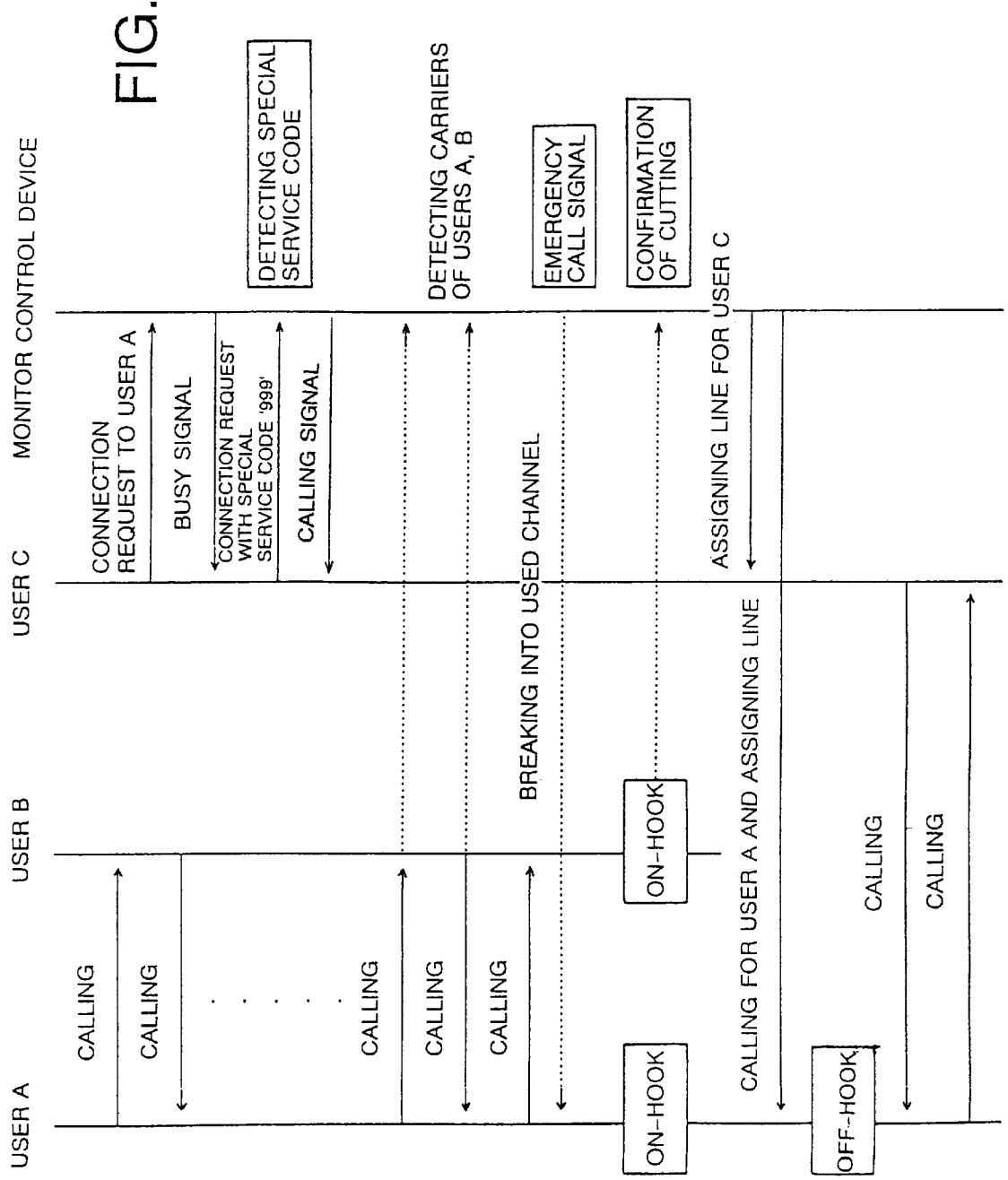

SATELLITE COMMUNICATION SYSTEM AND CENTER STATION

BACKGROUND OF THE INVENTION

1. Field of the Invention

The present invention relates to a satellite communication system of the SCPC method using a voice activation, and relates to a center station used in order to carry out such a satellite communication system.

2. Description of the Related Art

In the conventional satellite communication system of the SCPC (Single Channel Per Carrier) method, when an user A communicates with an user B, an user C can communicate with neither the user A nor the user B. Thus, when the user A communicates with the user B, the user C must wait until the communication terminates in order to notify the user B of information.

As above described, in the conventional satellite communication system of the SCPC method, when a person communicates with another person, no one can communicate with the person until the communication terminates. In other words, the conventional satellite communication system has a possibility that it is impossible to notify an user of emergency information, such as disaster information.

Additionally, when a modulator-demodulator (modem) for a control signal such as a pilot signal (a modulator-demodulator for line control) is provided in a VAST (Very Small Aperture Terminal) station in a satellite communication system in addition to the modem for the telephone line, the line can be forcibly cut off by using the control signal. However, when the line is forcibly cut off, an user tends to redial, since the user does not understand the reason of the cut-off. Further, since it takes a cost to implement the VAST station, it is not a wise plan to adopt this approach in order to makes the emergency communication possible.

SUMMARY OF THE INVENTION

The present invention has its object to provide a satellite communication system capable of notifying an user in speaking that a connection is required and capable of being carried out at low cost, and to provide a center station capable of implementing such a satellite communication system.

To solve the above problems, according to the present invention, a center station used in a satellite communication system, user terminals of the satellite communication system performing a voice activation in accordance with a SCPC (Single Channel Per Carrier) method, the center station comprising (a) a specifying unit, when a connection request for an user terminal in speaking is received, for specifying a frequency of a carrier assigned to a reception line of the user terminal, (b) a measurement unit for measuring a level of the carrier of which the frequency specified by the specifying unit, and (c) a transmission unit for transmitting a notification signal notifying the user terminal that the connection request using the carrier of the frequency specified by the specifying means is transmitted, when the level measured by the measurement means is not more than a predetermined level.

In other words, in communication in accordance with the SCPC method using the voice activation, the carrier from an user terminal not in speaking to another user terminal is suppressed, therefore, no crosstalk occurs through a carrier of the frequency equal to that of the carrier transmitted by the user terminal not in speaking. The center station of the present invention utilizes this feature so as to notify an user terminal in speaking to another user terminal that a connect request is transmitted.

In order to carry out the center station of the present invention, the specifying unit may specify frequencies of carriers respectively assigned to a reception line and a transmission line for the user terminal, the measurement unit may measures two respective levels of the carriers of which the frequencies is specified by said specifying means, and the transmission unit may transmit the notification signal when the level of the carrier assigned to the recaption line is not more than the predetermined level and when a level of the carrier assigned to the transmission line is not less than a second predetermined level.

In other words, the center station may be structured in a manner that the notification signal is transmitted when an user to whom a connection request is transmitted utters, and when another user terminal in talking with the user does not utter. With this center station, it is possible to implement a satellite communication system in which the notification signal is surely transmitted to the user in speaking.

In order to carry out the center station of the present invention, the specifying unit may function whenever a connection request is received or when a connection request containing a predetermined special service code is received.

Further, a center station may further comprise a monitor unit for monitoring an using condition of a line for an user terminal transmitting the notification signal, a call connection unit, when the monitor unit detects that the line for the user terminal is cut off, for calling the user terminal and an user terminal transmitting the connection request so as to connect the user terminals, or for calling the user terminal so as to connect the user terminal and the user terminal transmitting the connection request.

In other words, a center station may be structured in a manner that a satellite communication system can be implemented, in which a receiver is put on the hook for waiting after transmitting a connection request, or in which a receiver is kept out of the hook for waiting.

BRIEF DESCRIPTION OF THE DRAWINGS

Other objects and advantages of the present invention will become apparent during the following discussion conjunction with the apparent during the following discussion conjunction with the accompanying drawings, in which:

FIG. 7 is a sequence diagram showing a case in that a connection between an user C and an user A succeeds in the satellite communication system of the first embodiment; and FIG. 8 is a sequence diagram explaining an operation of a satellite communication system of the second embodiment.

DETAILED DESCRIPTION OF THE PREFERRED EMBODIMENT

Hereinafter, concrete explanations will be given of embodiments according to the present invention.

<First Embodiment>

Figure 1:
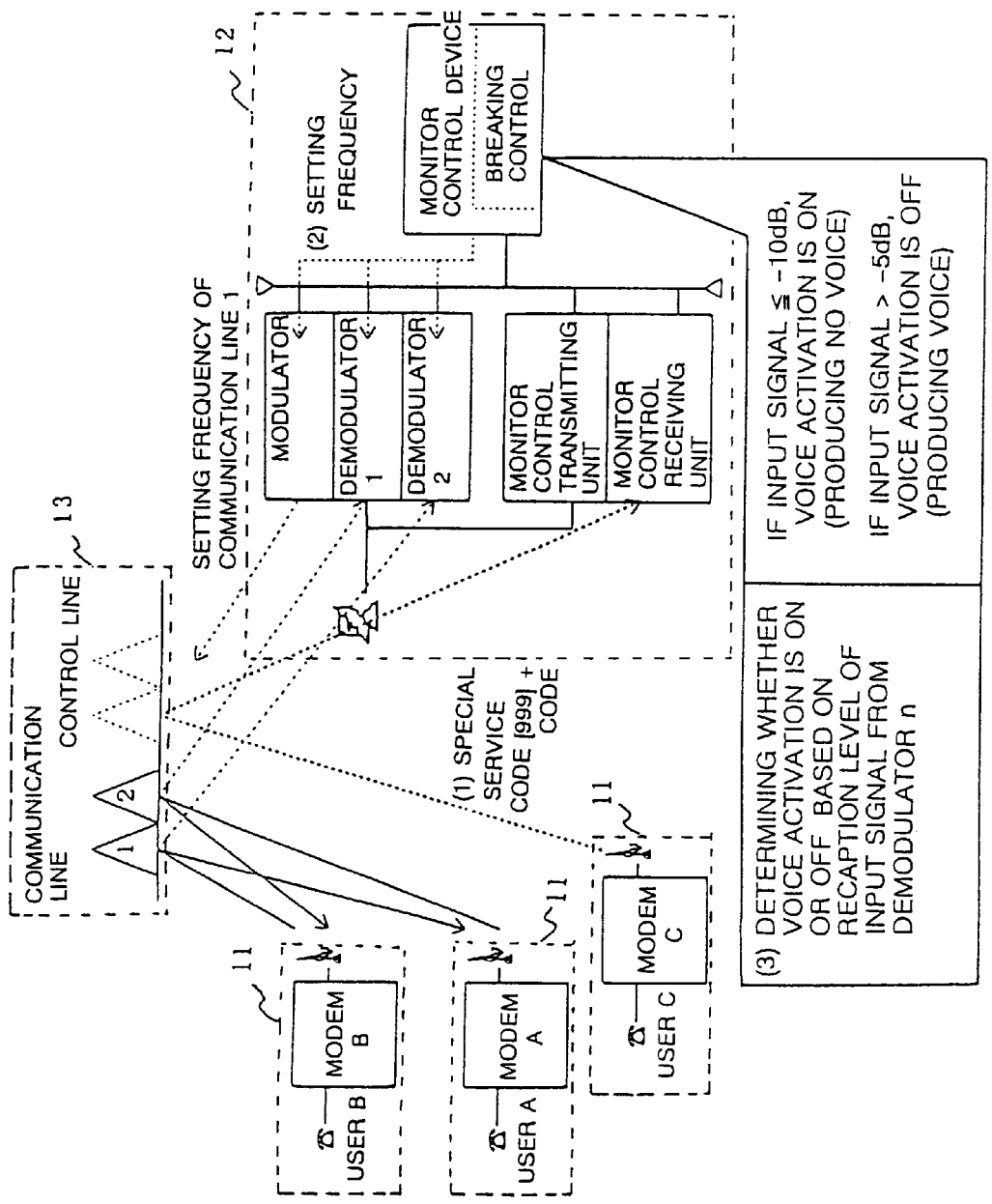
FIG. 1 is an explanatory view showing a structure and an operation of a satellite communication system according to the first embodiment of the present invention.
Figure 2:
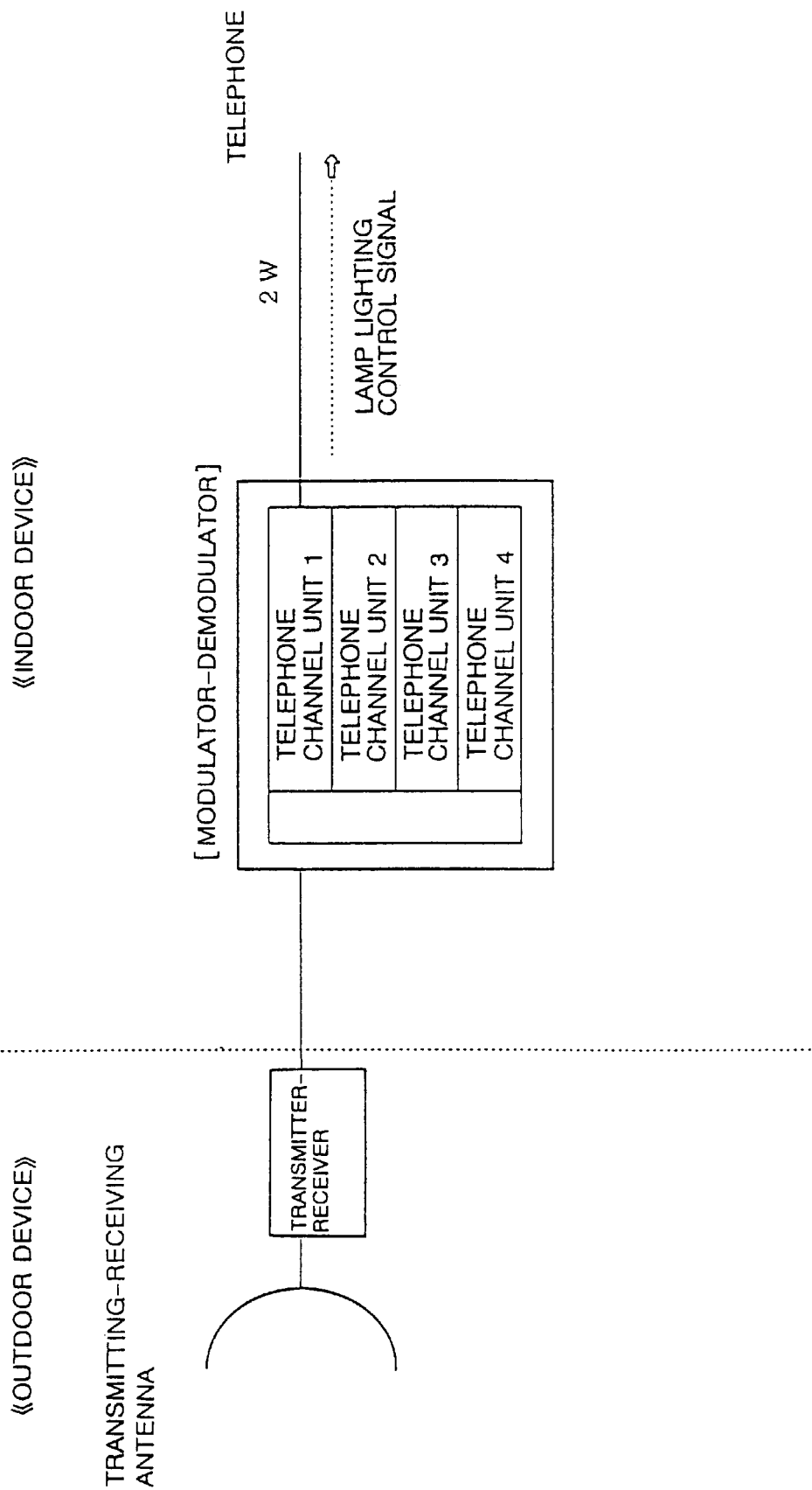
FIG. 2 is a block diagram showing a structure of a VAST station used in the satellite communication system of the first embodiment.
Figure 3:
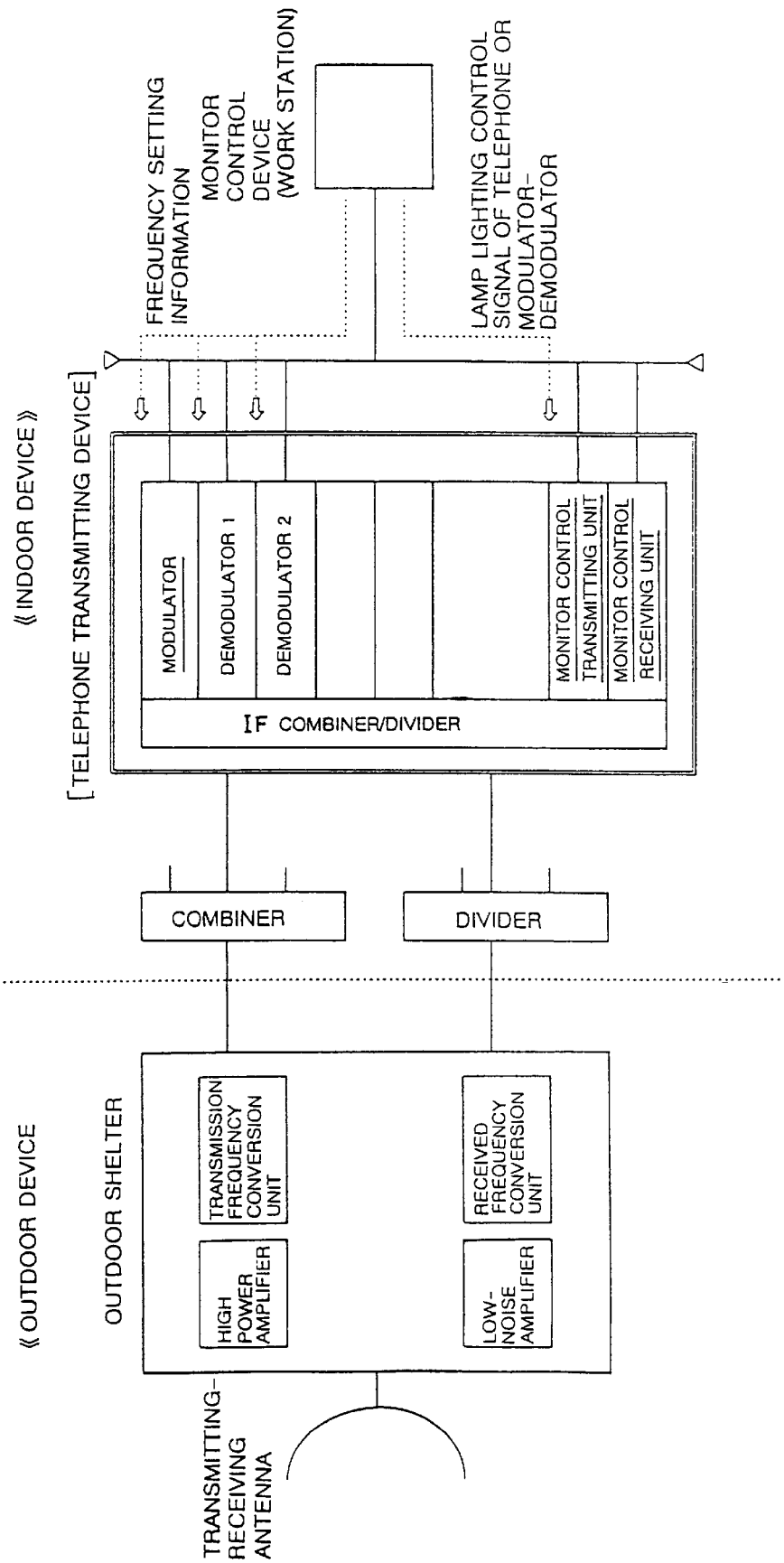
FIG. 3 is a block diagram showing a structure of a center station used in the satellite communication system of the first embodiment.

As shown in FIG. 1, a satellite communication system of the first embodiment is provided with plural VAST (Very Small Aperture Terminal) stations 11, a center station (called also a HUB station) 12 and a communication satellite 13. In this satellite communication system, as shown in FIG. 2, an usual VAST station is used as the VAST station 11, which is provided with a transmitting-receiving radio antenna, a transmitter-receiver, a modulator-demodulator, and a telephone. As shown in FIG. 3, the center station 12 is structured almost similarly to an usual center station, and is provided with a transmitting-receiving radio antenna, an outdoors shelter, a telephone transmission device, a monitor control unit and so on. Further, the telephone transmission device is provided with a modulator and two demodulator used for the interruption (breaking) control.

Returning to FIG. 1, the explanation of the satellite communication system of the first embodiment is continued. In this satellite communication system, a person (hereinafter, called an user C) who wants to urgently communicate with an user (hereinafter, called an user A) dials the telephone number of the user A in addition to a special service code "999". As a result of this operation, a connection request generated in the VAST station 11 is received by the monitor control receiving unit in the center station 12 via a control line similarly to an usual satellite communication system (1).

The monitor control device, when detecting that the monitor control receding unit receives the connection request containing the special service code "999", starts the interruption control process. In the interruption control process (described later in detail), frequencies for the transmission carrier and for the reception carrier given to the user A are specified based on the telephone number in the connection request (the telephone number of the user A). Then, in order to measure levels of the transmission carrier and the reception carrier, frequencies of the demodulator 1, 2 are set (adjusted) based on these frequencies, and in order to execute transmission by using the reception carrier, a frequency of the modulator is set (2).

Subsequently, based on the level of the signal received by each demodulator, it is judged whether a voice activation for each call line is OFF or ON (3). When the user A is speaking, and when the user B to whom the user A is speaking is not speaking, or when both are not speaking, the user A is notified that there is an emergency call by using the modulator for which the frequency is set.

Figure 4:
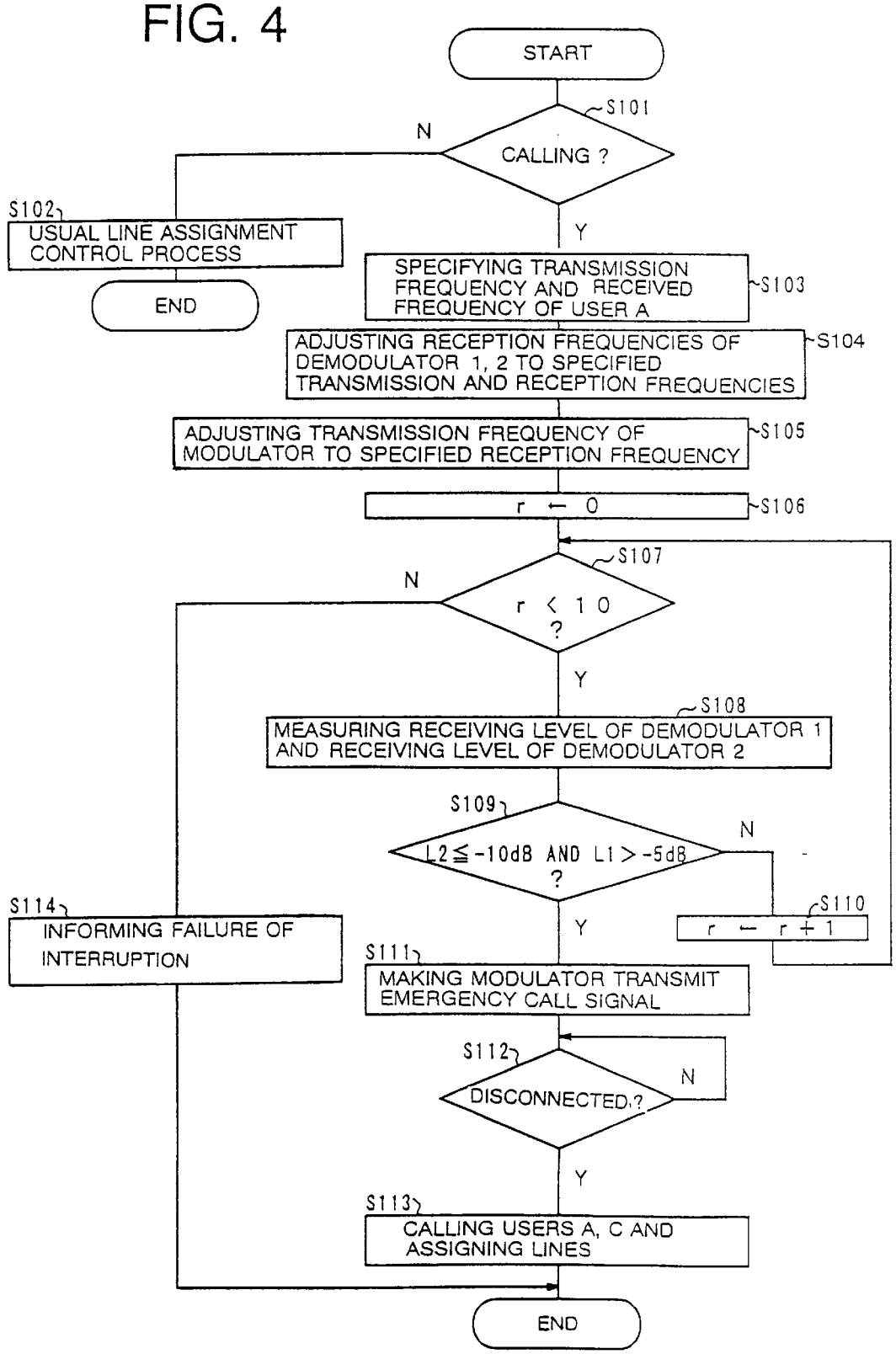
FIG. 4 is a flowchart showing an interruption control process executed by a monitor control device in the center station used in the satellite communication system of the first embodiment.
Figure 5:
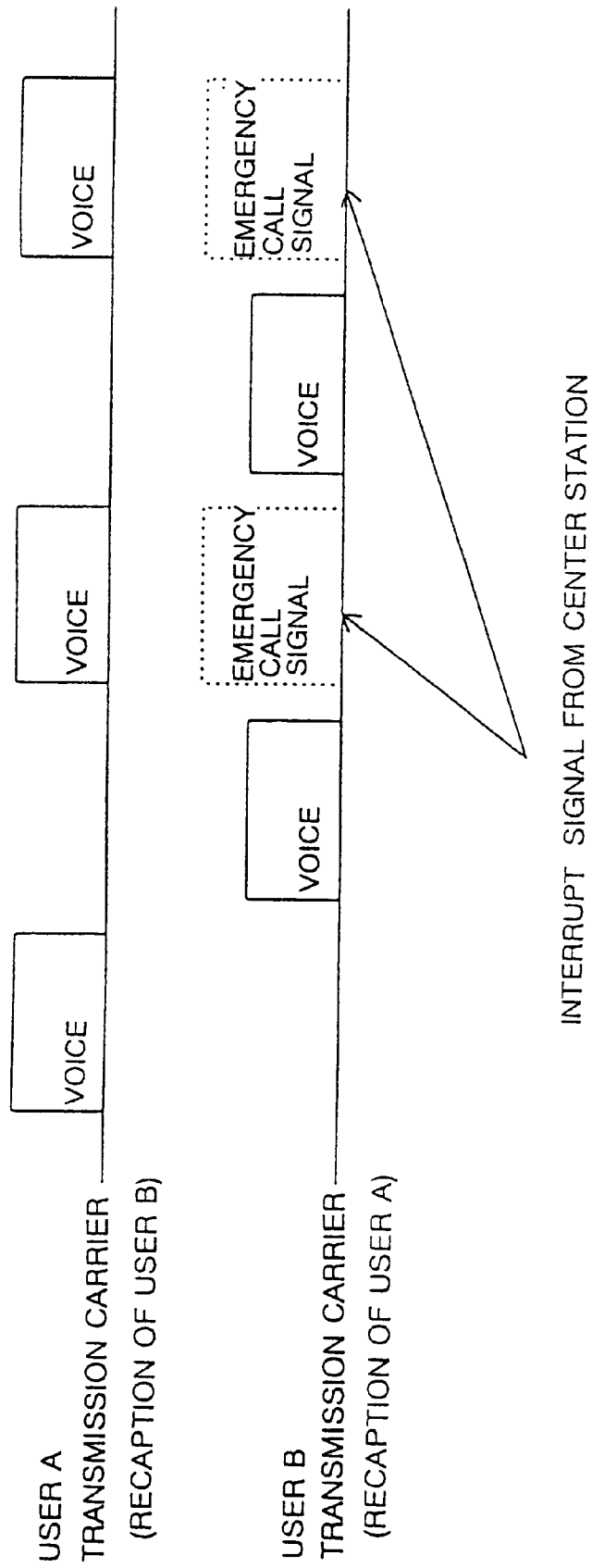
FIG. 5 is a timing chart explaining a transmission timing of an emergency call signal in the satellite communication system of the first embodiment.
Figure 6:
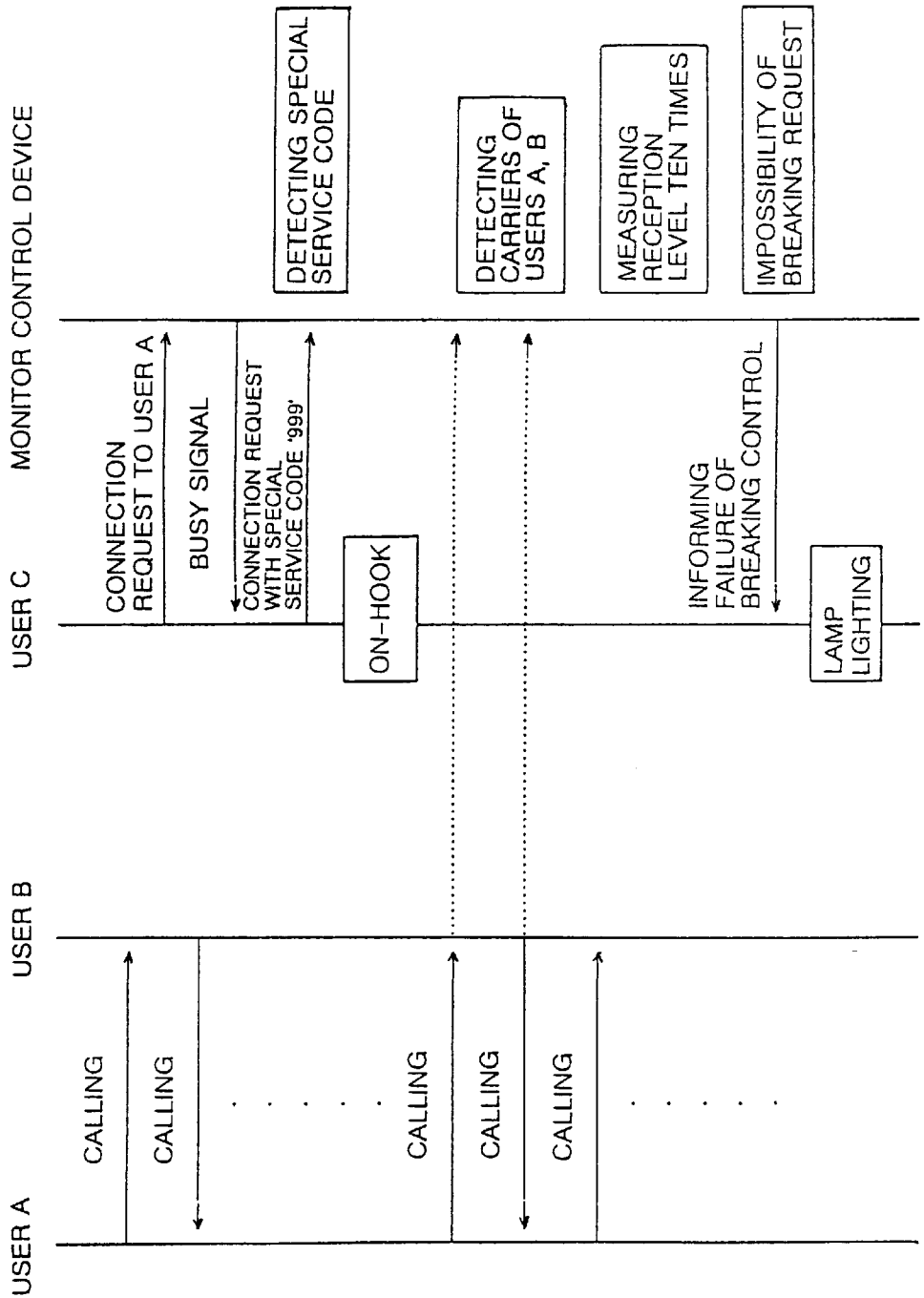
FIG. 6 is a sequence diagram showing a case in that a connection between an user C and an user A results in failure in the satellite communication system of the first embodiment.

Hereinafter, more concrete explanations will be given of the operation of this satellite communication system with reference to FIG. 4 and FIG. 7. FIG. 4 is a flowchart showing the interruption control process executed by the monitor control device detecting that a connection request for the user A is received, the connection request transmitted from the user C by adding the special service code "999". FIG. 5 is a timing chart explaining a transmission timing of the emergency call signal. FIG. 6 is a sequence diagram showing a case in that a connection between an user C and an user A results in failure. FIG. 7 is a sequence diagram showing a case in that a connection between an user C and an user A succeeds. FIGS. 6 and 7 show sequences diagram in a case that an user dials a special service code in addition to a telephone number after dialing only the telephone number.

As shown in FIG. 4, the monitor control device, when detecting that the telephone number of the user A is received together with the special service code "999", judges whether the user A is speaking or not (step S101). When the user A is not speaking (step S101; N), an usual line assignment control process is executed.

When the user A is speaking (step S101; Y), the monitor control device specifies the transmission frequency (the frequency of the transmission carrier of the user A) and the received frequency (the frequency of reception carrier, and the frequency of the transmission carrier of the user B to whom the user A is speaking) (step S103). Subsequently, the reception frequencies of the demodulator 1, 2 are respectively adjusted to the specified transmission and reception frequencies of the user A (step S104), and the transmission frequency of the modulator is adjusted to the reception frequency of the user A (step S105).

The user, when dialing the telephone number with the special service code "999", puts the receiver on the hook for a while, as shown in FIGS. 6 and 7. Additionally, in FIGS. 6 and 7, representations are omitted, however, when the process is advanced to the "Y" side in the step 101, a calling signal (tone) is turned to the user C from the center station, and when the process is advanced to the "N" side, the usual line assignment control process is executed (S102).

After adjusting the frequencies of demodulator and the modulator, the monitor control device sets "0" to a variable "r" for counting a number of measurement times of the reception level (FIG. 4; step S106). After confirming that the value of "r" is less than "10" (step S107; Y), the reception level L1 of the demodulator 1 and the reception level L2 of the demodulator 2 are measured (step S108). Subsequently, it is judge whether a condition that the level L2 is not more than −10 dB and the level L1 exceeds −5 dB (hereinafter, called a interruption condition) is satisfied or not (step S109).

When the interruption condition is not satisfied (step S109; N), the monitor control device increase the value of "r" by "1" (step S110), and return to the process to step S107. The monitor control device repeats this process while the value of "r" is not more than 10, and when the value of "r" reaches 10 without satisfying the breaking condition (step 107; N), notifies the user of failure of the interruption process via the control line (step S114) and terminates the process in FIG. 4.

Additionally, the center station in this embodiment notifies the user C of the failure in step S114, as shown in FIG. 6, by transmitting a control signal lighting a lamp in the VAST station of the user C in a predetermined pattern.

On the other hand, when the interruption condition is satisfied (FIG. 4; step S109; Y), the monitor control device makes the modulator transmit an emergency call signal (step S111). In other words, as shown in FIG. 5, when the user A is speaking and when the user B is not speaking, the center station transmits the emergency call signal using the transmission carrier of the user B. Additionally, the center station of this embodiment transmits an audio signal such as "an emergency call is received, please replace your receiver" as the emergency call signal.

The user A who receives the emergency call signal, as shown in FIG. 7, puts the receiver on the hook in accordance with this instruction so as to cuts off the line.

The monitor control device in the center station, as shown in FIG. 4, waits that the line is disconnected after transmitting the emergency call signal (step S112), and when detecting that the line is disconnected (step S112; Y), calls the users A, C and assigns lines (step S113). As a result, the user A can speak with the user C as shown in FIG. 7.

As above described, in the satellite communication system of this embodiment, it is possible to notify an user in speaking of emergency information. Further, the satellite communication system is implemented with usual and light weight VAST stations, so that it is possible to carry out a communication of urgency in a disaster effectively.

<Second Embodiment>

A satellite communication system of the second embodiment, in which it is unnecessary to put a receiver on a hook after dialing the special service code, is structured by modifying the satellite communication system of the first embodiment, and is different from the first embodiment in only the operation of the center station. Thus, explanations will be given of only different parts.

As shown in FIG. 8, a monitor control device in the center station of the satellite communication system according to the second embodiment returns a calling response to the user C, when the monitor control device receives a connection request to which the special service code "999" is add from the user C, and when the user A who is a connection destination of the connection request is speaking.

Then, the monitor control devices works similarly to that in the first embodiment until detecting that the line is cut off. The monitor control device, when detecting that the line is cut off, assigns a line for the user C, and calls and assigns a line for the user A.

<Modification>

The center station of each embodiment can be modified in various ways. For example, the center station may be modified so as to transmit a control signal lighting a lamp of the VSTA station as an emergency call signal. The center station may also be modified in a manner that only one demodulator is provided and two signal levels of carriers are measured with the demodulator.

The center station may also be modified in a manner that the measurement is repeated until the interruption condition is satisfied, or in a manner that the interruption process is executed when an usual telephone number is inputted. Further, the center station may be modified not so as to execute the detection of line cutting and the process following the detection (so as to notify a connection request transmitted from an user to another user and to connect these users separately).

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A center station used in a satellite communication system based on a SCPC (Single Channel Per Carrier) method, user terminals of said satellite communication system performing a voice activation, said center station comprising;

specifying means, when a connection request for an user terminal in speaking is received, for specifying a frequency of a carrier assigned to a reception line of the user terminal;

measurement means for measuring a level of the carrier of which the frequency is specified by the specifying means; and transmission means for transmitting a notification signal by using the carrier of which the frequency is specified by the specifying means, said notification signal notifying the user terminal that the connection request is received, when the level measured by the measurement means is not more than a predetermined level.

2. A center station according to claim 1, wherein said specifying means specifies two frequencies of carriers respectively assigned to a reception line and a transmission line for the user terminal, wherein said measurement means measures respective levels of the carriers of the frequencies specified by said specifying means, and wherein said transmission means transmits the notification signal when the level of the carrier assigned to the reception line is not more than the predetermined level and when another level of the carrier assigned to the transmission line is not less than another predetermined level.

3. A center station according to claim 1, wherein said specifying means functions when a predetermined special service code is received.

4. A center station according to claim 1, further comprising:

monitor means for monitoring an used condition of a line for an user terminal transmitting the notification signal;

call connection means, when the monitor means detects that the line for the user terminal is cut off, for calling the user terminal and an user terminal transmitting the connection request so as to connect the user terminals.

5. A center station according to claim 1, further comprising:

monitor means for monitoring an used condition of a line of an user transmitting the notification signal;

call connection means, when the monitor means detects that the line of the user is cut off, for calling the user and for connecting with an user transmitting the connection request.

6. A satellite communication system communicating between a center station and plural user terminals via a communication satellite, said satellite communication system based on a SCPC (Single Channel Per Carrier) method, said user terminals performing a voice activation, said center station comprising;

specifying means, when a connection request for an user terminal in speaking is received, for specifying a frequency of a carrier assigned to a reception line of the user terminal;

measurement means for measuring a level of the carrier of which frequency is specified by the specifying means; and transmission means for transmitting a notification signal by using the carrier of the frequency specified by the specifying means, said notification signal notifying the user terminal that the connection request is received, when the level measured by the measurement means is not more than a predetermined level.

* * * * *